(12) United States Patent
Mills (10) Patent No.: US 10,384,758 B2
(45) Date of Patent: Aug. 20, 2019

(54) SANDWICH PANEL ASSEMBLY AND METHOD

(71) Applicant: The Boeing Company, Chicago, IL (US)

(72) Inventor: Christopher J. Mills, Charleston, SC (US)

(73) Assignee: The Boeing Company, Chicago, IL (US)

( * ) Notice: Subject to any disclaimer, the term of this patent is extended or adjusted under 35 U.S.C. 154(b) by 878 days.

(21) Appl. No.: 15/006,884

(22) Filed: Jan. 26, 2016

(65) Prior Publication Data
US 2017/0210457 A1    Jul. 27, 2017

(51) Int. Cl.
| | | |
|---|---|---|
| *B64C 1/00* | (2006.01) |
| *B64C 1/12* | (2006.01) |
| *B32B 3/12* | (2006.01) |
| *A47B 47/04* | (2006.01) |
| *B32B 5/02* | (2006.01) |
| *B32B 7/02* | (2019.01) |
| *B32B 9/00* | (2006.01) |

(Continued)

(52) U.S. Cl.
CPC .............. *B64C 1/00* (2013.01); *A47B 47/042* (2013.01); *B32B 3/02* (2013.01); *B32B 3/06* (2013.01); *B32B 3/08* (2013.01); *B32B 3/12* (2013.01); *B32B 3/266* (2013.01); *B32B 5/02* (2013.01); *B32B 7/02* (2013.01); *B32B 9/005* (2013.01); *B32B 9/041* (2013.01); *B32B 15/02* (2013.01); *B32B 15/043* (2013.01); *B32B 15/046* (2013.01); *B32B 15/08* (2013.01); *B32B 15/18* (2013.01); *B32B 15/20* (2013.01); *B32B 27/065* (2013.01); *B64C 1/12* (2013.01); *B64F 5/10* (2017.01); *F16B 5/0614* (2013.01); *A47B 2230/0081* (2013.01); *A47B 2230/0096* (2013.01); *B32B 2250/03* (2013.01); *B32B 2250/40* (2013.01); *B32B 2262/101* (2013.01); *B32B 2262/106* (2013.01); *B32B 2266/0228* (2013.01); *B32B 2305/024* (2013.01);

(Continued)

(58) Field of Classification Search
CPC ..... B64D 11/00; B64D 11/003; F16B 21/075; F16B 2/14; F16B 5/0614; F16B 5/0635
See application file for complete search history.

(56) References Cited

U.S. PATENT DOCUMENTS 3,525,493 A * 8/1970 Newell .................. F16B 5/0614
248/220.21
3,950,915 A * 4/1976 Cole ..................... F16B 5/0614
52/586.2

(Continued)

FOREIGN PATENT DOCUMENTS

GB          2393207 A *   3/2004  ............ F16B 5/0614

OTHER PUBLICATIONS

European Patent Office, Extended European Search Report, EP 17 15 2850 (dated Jun. 27, 2017).

*Primary Examiner* — Daniel J Wiley
(74) *Attorney, Agent, or Firm* — Walters & Wasylyna LLC (57) ABSTRACT

A panel assembly including a first panel defining a slot, a second panel comprising a tab, wherein the tab is received in said slot and defines a gap in the slot between the tab and the first panel, and a joining assembly positioned in the gap, the joining assembly including an outer rack member engaged with the first panel, an inner rack member engaged with the second panel and a shim in ratcheting engagement with the outer rack member and the inner rack member.

20 Claims, 10 Drawing Sheets

(51) Int. Cl.
*B32B 9/04* (2006.01)
*B32B 15/02* (2006.01)
*B32B 15/04* (2006.01)
*B32B 15/08* (2006.01)
*B32B 15/18* (2006.01)
*B32B 15/20* (2006.01)
*B32B 27/06* (2006.01)
*B32B 3/02* (2006.01)
*B32B 3/06* (2006.01)
*B32B 3/08* (2006.01)
*B32B 3/26* (2006.01)
*F16B 5/06* (2006.01)
*B64F 5/10* (2017.01)
*F16B 2/14* (2006.01)
*F16B 5/07* (2006.01)

(52) U.S. Cl.
CPC ....... *B32B 2605/18* (2013.01); *B32B 2607/00* (2013.01); *F16B 2/14* (2013.01); *F16B 5/07* (2013.01)

(56) References Cited

U.S. PATENT DOCUMENTS

| | | | | |
|---|---|---|---|---|
| 3,999,356 A | * | 12/1976 | Packman | F16B 2/241 403/282 |
| 6,471,313 B1 | * | 10/2002 | Ueda | F16B 5/0642 24/297 |
| 7,051,408 B2 | * | 5/2006 | De Azevedo | F16B 2/241 24/289 |
| 7,963,038 B2 | | 6/2011 | Schmitz | |
| 9,073,267 B1 | * | 7/2015 | Badgley | B29C 65/542 |
| 2002/0005464 A1 | * | 1/2002 | Miura | F16B 5/0635 248/231.9 |
| 2002/0023991 A1 | * | 2/2002 | Harris | G09F 3/204 248/304 |
| 2014/0064833 A1 | * | 3/2014 | Reeves | B64D 11/003 403/291 |
| 2016/0258462 A1 | * | 9/2016 | Lewis | B64D 11/00 |

* cited by examiner

SANDWICH PANEL ASSEMBLY AND METHOD

FIELD

This application relates to panels, such as sandwich panels, and, more particularly, to the joining of panels.

BACKGROUND

Sandwich panels are typically formed from a core sandwiched between two face sheets. The core may be relatively thick, yet lightweight, as compared to the face sheets. The face sheets may be relatively thin, yet stiff. Therefore, sandwich panels typically possess relatively high strength and stiffness at relatively low weight.

Because of their relatively high strength and stiffness at relatively low weight, sandwich panels are widely used in various aerospace applications. For example, sandwich panels are used in the construction of aircraft, such as fixed-wing commercial aircraft. Specifically, sandwich panels are used to construct the flooring, walls and bulkheads that define the passenger cabin of an aircraft. Therefore, there is often a need to join one panel to another panel.

A perpendicular joint is often needed where a vertical sandwich panel transitions to a horizontal sandwich panel (e.g., a floor-to-wall transition). The "tab and slot" technique—based on the "mortise and tenon" technique common in carpentry—is one technique used to form a perpendicular joint between two sandwich panels. Specifically, the "tab and slot" technique involves forming slots in one panel and then engaging the slots with corresponding tabs formed on another panel. An adhesive is introduced to bond together the two panels.

Thus, the "tab and slot" technique for joining sandwich panels can be expensive due to the cost of the adhesive. The time required for surface treatment prior to adhesive application, as well as the cure time required after adhesive application, further contributes to the overall cost of using the traditional "tab and slot" technique for joining sandwich panels.

Accordingly, those skilled in the art continue with research and development efforts in the field of sandwich panel joining.

SUMMARY

In one embodiment, the disclosed panel assembly may include a first panel defining a slot, a second panel comprising a tab, wherein the tab is received in said slot and defines a gap in the slot between the tab and the first panel, and a joining assembly positioned in the gap, the joining assembly including an outer rack member engaged with the first panel, an inner rack member engaged with the second panel and a shim in ratcheting engagement with the outer rack member and the inner rack member.

In another embodiment, the disclosed panel assembly may include a first panel including a first major surface and a second major surface, the first panel defining a slot extending from the first major surface to the second major surface along a longitudinal axis, a second panel including a first major surface and a second major surface, the second panel defining an edge and including a tab extending from the edge, wherein the tab is received in the slot and defines a first gap between the first panel and the first major surface of the second panel, and a second gap between the first panel and the second major surface of the second panel, a first joining assembly positioned in the first gap, the first joining assembly including a first outer rack member engaged with the first panel, a first inner rack member engaged with the second panel and a first shim in ratcheting engagement with the first outer rack member and the first inner rack member, and a second joining assembly positioned in the second gap, the second joining assembly including a second outer rack member engaged with the first panel, a second inner rack member engaged with the second panel and a second shim in ratcheting engagement with the second outer rack member and the second inner rack member.

Also disclosed is a method for assembling a first panel and a second panel, wherein the first panel defines a slot and the second panel includes a tab. In one embodiment, the method may include the steps of (1) positioning an outer rack member in the slot such that the outer rack member is engaged with the first panel, (2) positioning an inner rack member on the tab such that the inner rack member is engaged with the second panel, (3) inserting the tab into the slot such that the outer rack member is opposed from the inner rack member, and (4) inserting a shim between the outer rack member and the inner rack member, wherein the shim is in ratcheting engagement with the outer rack member and the inner rack member.

Other embodiments of the disclosed panel assembly and method will become apparent from the following detailed description, the accompanying drawings and the appended claims.

DETAILED DESCRIPTION

Figure 1:
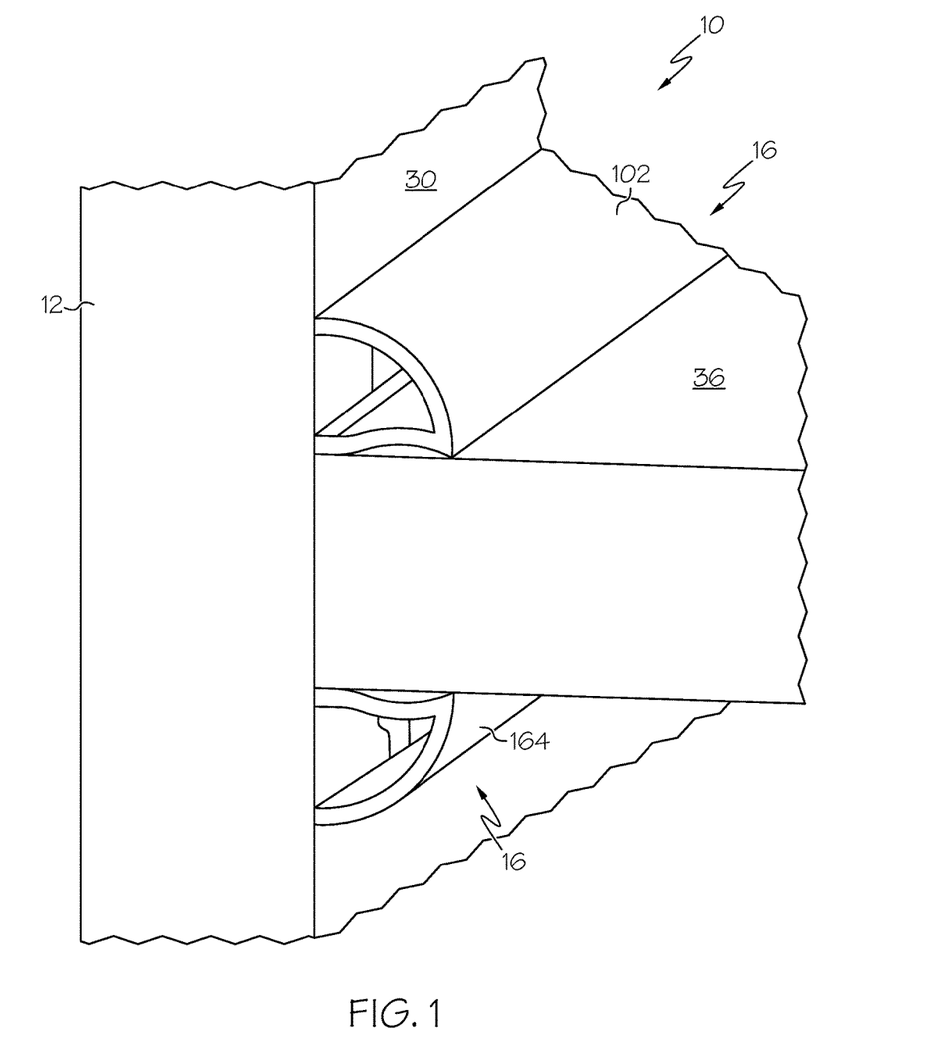
FIG. 1 is a side perspective view of one embodiment of the disclosed panel assembly.
Figure 2:
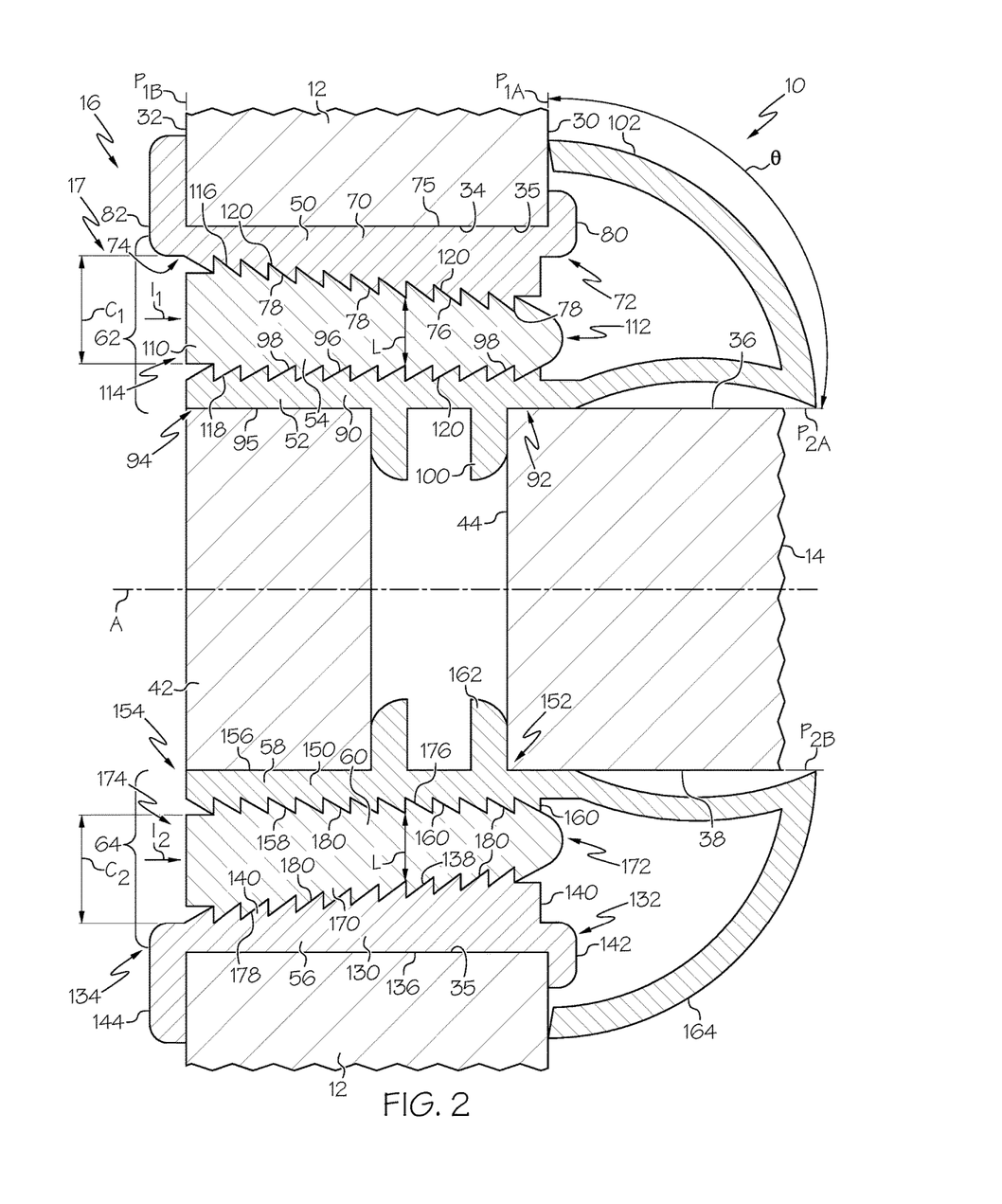
FIG. 2 is a side elevational view, in section, of the panel assembly of FIG. 1.

Referring to FIGS. 1 and 2, one embodiment of the disclosed panel assembly, generally designated 10, may include a first panel 12, a second panel 14 and joining hardware 16. The joining hardware 16 may connect the second panel 14 to the first panel 12 such that the second panel 14 is disposed at a transverse angle θ (FIG. 2), such as about 90 degrees (e.g., substantially perpendicular), relative to the first panel 12. Significantly, the joining hardware 16 may effect a tight, rattle-free connection between the first panel 12 and the second panel 14 without the need for adhesives, though adhesives may optionally be used to further reinforce the connection, and even when there is variation in the thicknesses of the first and second panels 12, 14.

For simplicity, the first and second panels 12, 14 of the disclosed panel assembly 10 are shown in FIGS. 1 and 2 having a generally solid and uniform cross-sectional profile. However, those skilled in the art will appreciate that the first and second panels 12, 14 of the disclosed panel assembly 10 may have various constructions and compositions without departing from the scope of the present disclosure.

Figure 3:
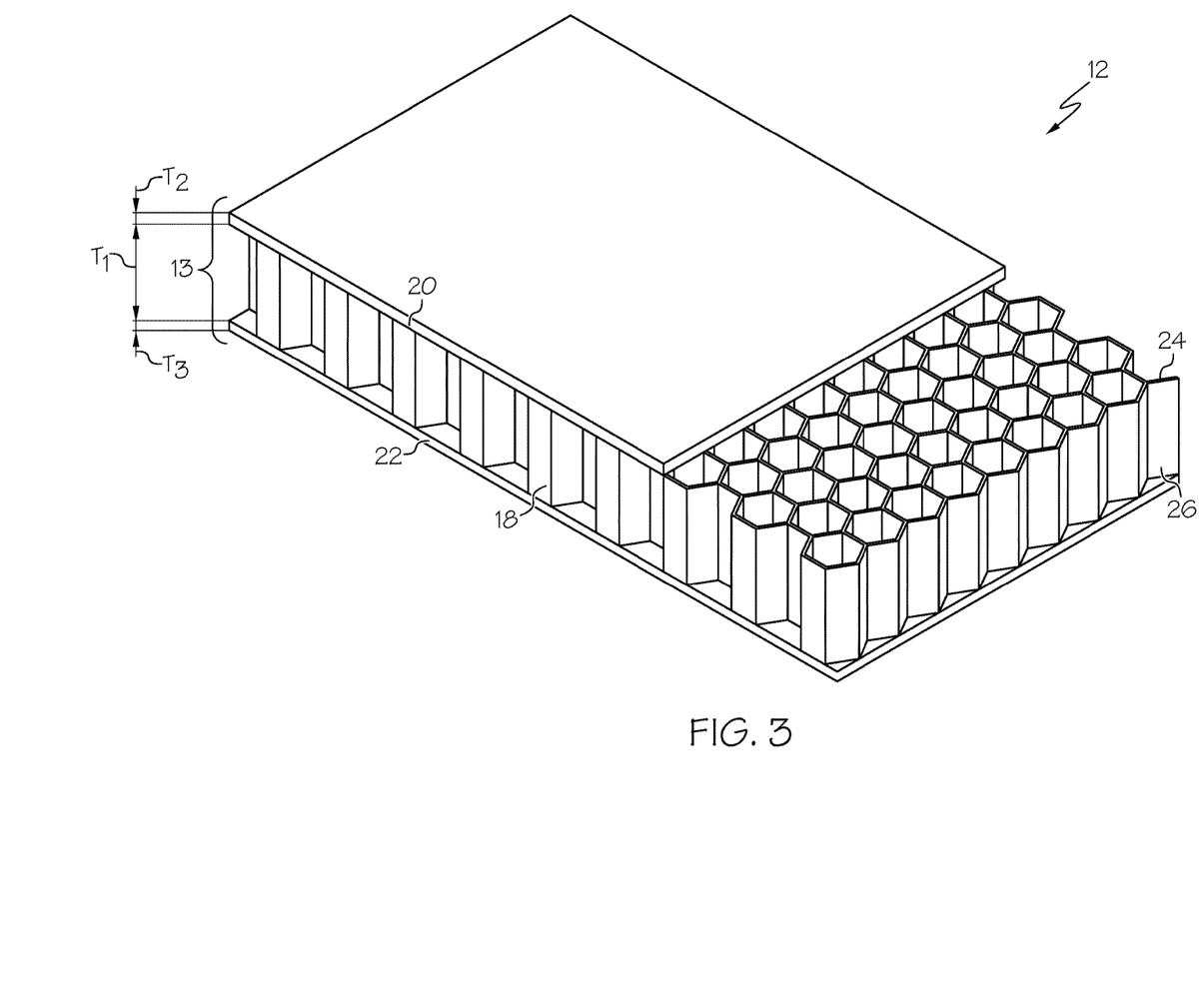
FIG. 3 is a perspective view of a sandwich panel useful for forming the disclosed panel assembly.

In one particular construction, one or both of the first and second panels 12, 14 of the disclosed panel assembly 10 may be sandwich panels. For example, as shown in FIG. 3, the first panel 12 may include a layered structure 13 that includes a core 18, a first face sheet 20 and a second face sheet 22. The second panel 14 (not shown in FIG. 3) may include the same (or similar) structure as the sandwich panel-type layered structure 13 of the first panel 12 shown in FIG. 3.

While the layered structure 13 of the first panel 12 is shown with three layers 18, 20, 22, additional layers, such as additional core layers, additional face sheets and/or additional other layers, may be included without departing from the scope of the present disclosure. Alternatively, the second face sheet 22 may be optional and, therefore, may be omitted from the layered structure 13 of the first panel 12 without departing from the scope of the present disclosure.

The core 18 of the layered structure 13 of the first panel 12 may include a first major side 24 and an opposed second major side 26. The first face sheet 20 may be connected (e.g., adhered, welded, braised, mechanically fastened etc.) to the first major side 24 of the core 18 and the second face sheet 22 may be connected (e.g., adhered, welded, braised, mechanically fastened etc.) to the second major side of the core 18, thereby sandwiching the core 18 between the first face sheet 20 and the second face sheet 22.

The cross-sectional thickness $T_1$ of the core 18 of the layered structure 13 of the first panel 12 may be relatively thick, as compared to the cross-sectional thicknesses $T_2$, $T_3$ of the first face sheet 20 and the second face sheet 22 (e.g., $T_1 > T_2$ and $T_1 > T_3$). For example, the cross-sectional thickness $T_1$ of the core 18 may be two or more times greater (e.g., five times greater) than the cross-sectional thickness $T_2$ of the first face sheet 20. However, the core 18 may have a relatively lower density (basis weight divided by cross-sectional thickness), as compared to the densities of the first face sheet 20 and the second face sheet 22.

Structurally, the core 18 of the layered structure 13 of the first panel 12 may have a honeycomb structure, as shown in FIG. 3. However, lower densities may be achieved using various non-solid structures. As one alternative example, the core 18 may be (or may include) a foam. As another alternative example, the core 18 may be fluted or may include fluting.

Compositionally, the core 18 of the layered structure 13 of the first panel 12 may be formed from the same, similar or different materials than the first 20 and second 22 face sheets. However, the core 18 may typically be a structure with less density than the face sheets 20, 22. As one specific, non-limiting example, the core 18 may be formed from a polymer (e.g., expanded polystyrene). As another specific, non-limiting example, the core 18 may be a honeycomb structure formed from a composite, such as a carbon fiber-reinforced composite or a fiberglass composite. As yet another specific, non-limiting example, the core 18 may be a honeycomb structure formed from a ceramic or metal, such as titanium, steel, aluminum or an aluminum alloy.

The first face sheet 20, which may be single ply or multi-ply, may be any material capable of being layered over and connected to the core 18. As one specific, non-limiting example, the first face sheet 20 may be a polymer, such as a polymer film, sheet or mesh. As another specific, non-limiting example, the first face sheet 20 may be a composite, such as a carbon fiber-reinforced composite or a fiberglass composite. As another specific, non-limiting example, the first face sheet 20 may be a ceramic. As yet another specific, non-limiting example, the first face sheet 20 may be a metal film, sheet or mesh.

The second face sheet 22, which may be single ply or multi-ply, may be formed from the same, similar or different material than the first face sheet 20. As one specific, non-limiting example, the second face sheet 22 may be a polymer, such as a polymer film, sheet or mesh. As another specific, non-limiting example, the second face sheet 22 may be a composite, such as a carbon fiber-reinforced composite or a fiberglass composite. As yet another specific, non-limiting example, the second face sheet 22 may be a metal film, sheet or mesh.

Figure 4:
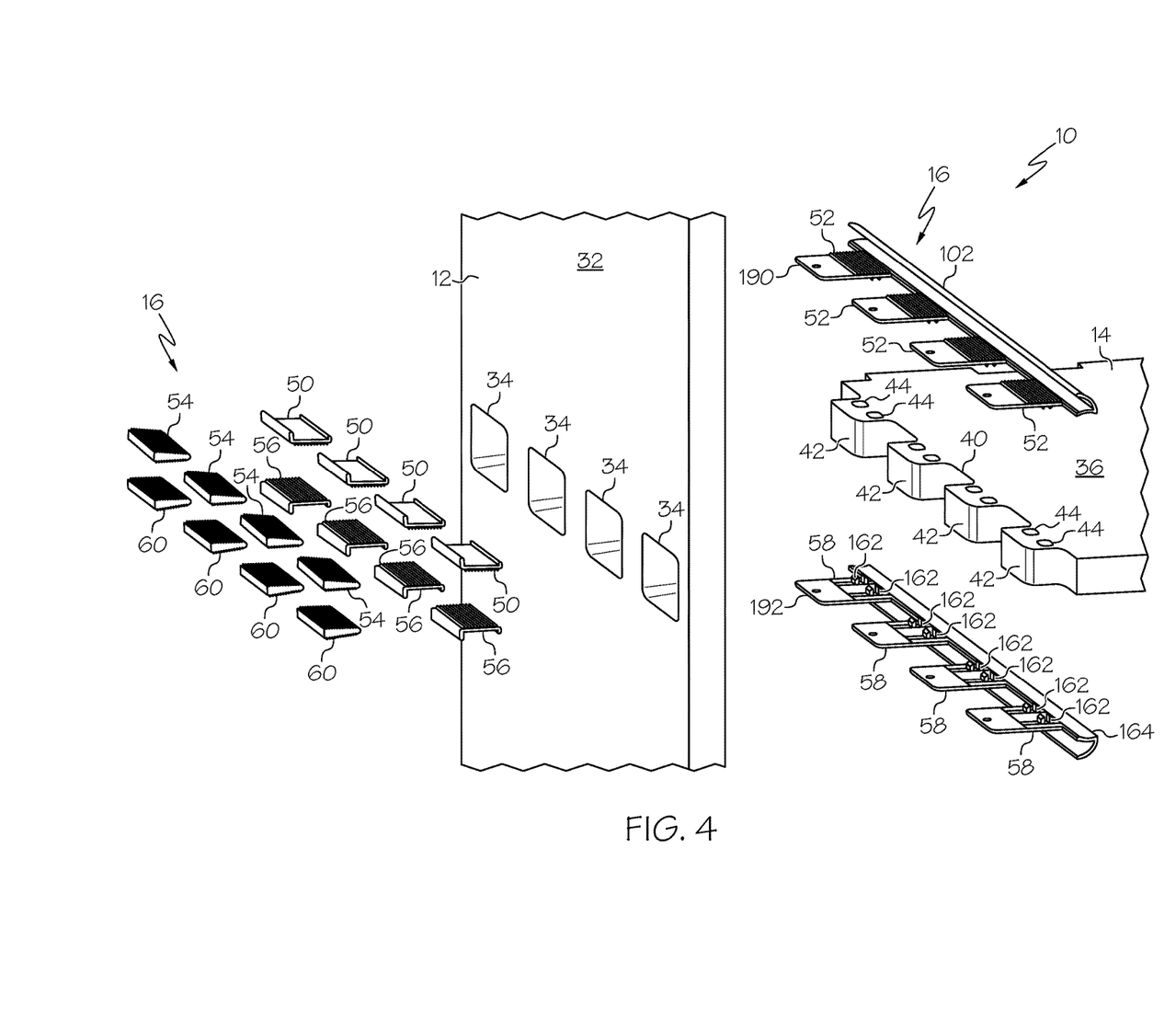
FIG. 4 is an exploded perspective view of the panel assembly of FIG. 1.

Referring to FIGS. 2 and 4, the first panel 12 of the disclosed panel assembly 10 may include a first (e.g., front) major surface 30 and an opposed second (e.g., rear) major surface 32. A plane $P_{1A}$ (FIG. 2) coincident with the first major surface 30 may be substantially parallel with a plane $P_{1B}$ (FIG. 2) coincident with the second major surface 32. The first panel 12 may define one or a plurality of slots 34 (four slots 34 are shown in FIG. 4) longitudinally extending (see longitudinal axis A in FIG. 2) through the first panel 12 from the first major surface 30 to the second major surface 32.

As used herein, "slot" broadly refers to any opening in the first panel 12 capable receiving a corresponding tab 42 of the second panel 14. Slots 34 having various shapes and configurations may be used without departing from the scope of the present disclosure. Indeed, the slots 34 may be elongated or not elongated, and may be narrow or not narrow, without departing from the scope of the present disclosure.

The second panel 14 of the disclosed panel assembly 10 may include a first (e.g., upper) major surface 36 and an opposed second (e.g., lower) major surface 38. A plane $P_{2A}$ (FIG. 2) coincident with the first major surface 36 may be substantially parallel with a plane $P_{2B}$ (FIG. 2) coincident with the second major surface 38. The second panel 14 may further include an edge 40 (FIG. 4) extending from the first major surface 36 to the second major surface 38. The second panel 14 may be connected to the first panel 12 along the edge 40, thereby establishing the transverse angle θ between the first panel 12 and the second panel 14, specifically the transverse angle θ between the plane $P_{1A}$ (FIG. 2) coincident with the first major surface 30 of the first panel 12 and the plane $P_{2A}$ coincident with the first major surface 36 of the second panel 14.

One or a plurality of tabs 42 (only four tabs 42 are shown in FIG. 4) may protrude outward from the edge 40 of the second panel 14. The tabs 42 may be integral with the second panel 14 (e.g., the tabs 42 and the second panel 14 may be formed as a single monolithic body). The tabs 42 may be sized and shaped to fit into corresponding slots 34 in the first panel 12, while still providing space (see gaps 62, 64 in FIG. 2) within the slots 34 for the joining hardware 16, as is described in greater detail herein.

Each tab 42 may define one or more recesses 44 therein (e.g., two recesses 44 per tab 42 are shown in FIG. 4). In FIG. 2, the recess 44 is shown extending through the second panel 14 (e.g., from the first major surface 36 to the second major surface 38). However, separate recesses 44 (not a through-recess) may be provided on each surface 36, 38 of the second panel 14 without departing from the scope of the present disclosure.

Referring to FIG. 2, the joining hardware 16 may include a first outer rack member 50, a first inner rack member 52, a first shim 54, a second outer rack member 56, a second inner rack member 58 and a second shim 60. The first outer rack member 50, the first inner rack member 52 and the first shim 54 may be assembled to form a first joining assembly 17, and the first joining assembly 17 may be positioned in the slot 34 defined by the first panel 12, specifically in the first gap 62 between the first panel 12 and the first major surface 36 of the tab 42 of the second panel 14. The second outer rack member 56, the second inner rack member 58 and the second shim 60 may be assembled to form a second joining assembly 19, and the second joining assembly 19 may be positioned in the slot 34 defined by the first panel 12, specifically in the second gap 64 between the first panel 12 and the second major surface 38 of the tab 42 of the second panel 14.

As shown in FIG. 4, joining hardware 16 for assembling a first joining assembly 17 (FIG. 2) and a second joining assembly 19 (FIG. 2) may be provided for each slot 34 defined by the first panel 12 (and associated tab 42 on the second panel 14). In the example of FIG. 4, since the first panel 12 includes four slots 34 and the second panel 14 includes four tabs 42, the joining hardware 16 includes four first outer rack members 50, four first inner rack members 52, four first shims 54, four second outer rack members 56, four second inner rack members 58 and four second shims 60.

Referring back to FIG. 2, the first joining assembly 17 may be positioned in the first gap 62 between the first panel 12 and the first major surface 36 of the second panel 14. Therefore, the first joining assembly 17 may provide a first connection between the first panel 12 and the second panel 14.

The first outer rack member 50 of the first joining assembly 17 may be received in the slot 34 defined by the first panel 12 and may be engaged with the first panel 12. The first outer rack member 50 may include a body 70 elongated along the longitudinal axis A (which may be generally parallel with the plane $P_{2A}$ coincident with the first major surface 36 of the second panel 14). The elongated body 70 may include a first end portion 72 and an opposed second end portion 74. The elongated body 70 may include an abutting surface 75 and an opposed rack surface 76, which may extend from proximate (at or near) the first end portion 72 of the elongated body 70 to proximate the second end portion 74. The rack surface 76 may include a plurality of serrations 78 extending laterally relative to the longitudinal axis A. A first flange 80 may be connected proximate the first end portion 72 of the elongated body 70 and a second flange 82 may be connected proximate the second end portion 74. The first and second flanges 80, 82 may be integral with the elongated body or formed separately and attached to the elongated body.

The first outer rack member 50 may be engaged with the first panel 12 by positioning the elongated body 70 of the first outer rack member 50 within the slot 34 such that the first panel 12 is positioned between the first flange 80 and the second flange 82, and the abutting surface 75 of the elongated body 70 abuts the inner surface 35 of the slot 34. The length of the elongated body 70 of the first outer rack member 50 and, thus, the spacing between the first flange 80 and the second flange 82 may be selected such that the first flange 80 abuts the first major surface 30 of the first panel 12 and the second flange abuts the second major surface 32 of the first panel 12, thereby effectively clipping the first outer rack member 50 onto the first panel 12. Therefore, the first flange 80 and the second flange 82 may inhibit movement of the first outer rack member 50 relative to the first panel 12 along the longitudinal axis A.

The first inner rack member 52 of the first joining assembly 17 may be engaged with the second panel 14, such as with the tab 42 of the second panel 14. The first inner rack member 52 may include a body 90 elongated along the longitudinal axis A, and including a first end portion 92 and an opposed second end portion 94. The elongated body 90 may include an abutting surface 95 and an opposed rack surface 96, which may extend from proximate the first end portion 92 of the elongated body 90 to proximate the second end portion 94. The rack surface 96 may include a plurality of serrations 98 extending laterally relative to the longitudinal axis A.

One or more bosses 100 may protrude outward from the abutting surface 95 of the elongated body 90. The bosses 100 may be sized and shaped to be closely received in corresponding recesses 44 in the tab 42 of the second panel 14.

The first inner rack member 52 may be engaged with the second panel 14 by positioning the abutting surface 95 of the elongated body 90 of the first inner rack member 52 against the first major surface 36 of the second panel 14 such that the bosses 100 (only one boss 100 is shown in FIG. 2) are received in the corresponding recesses 44 (only one recess 44 is shown in FIG. 2) defined in the tab 42 of the second panel 14. Therefore, the bosses 100 may inhibit movement of the first inner rack member 52 relative to the second panel 14 along the longitudinal axis A.

In one optional implementation, the first inner rack member 52 may include a fractional round portion 102 connected to the first end portion 92 of the elongated body 90. For example, when the transverse angle θ between the plane $P_{1A}$ (FIG. 2) coincident with the first major surface 30 of the first panel 12 and the plane $P_{2A}$ coincident with the first major surface 36 of the second panel 14 is about 90 degrees, the fractional round portion 102 may be configured as quarter round. The fractional round portion 102 of the first inner rack member 52 may cover the first joining assembly 17, thereby providing an aesthetically pleasing transition between the first panel 12 and the second panel 14, as best shown in FIG. 1.

As shown in FIG. 4, the fractional round portion 102 may laterally extend across plural first inner rack members 52, thereby interconnecting the first inner rack members 52. Those skilled in the art will appreciate that a continuous fractional round portion 102 having a length corresponding to the length of the edge 40 of the second panel 14 may provide a continuous and, therefore, more aesthetically pleasing transition between the first panel 12 and the second panel 14 (as compared to multiple adjacently aligned fractional round portions 102).

Referring back to FIG. 2, the first shim 54 of the first joining assembly 17 may include a body 110 elongated along the longitudinal axis A, and including a first end portion 112 and an opposed second end portion 114. The elongated body 110 may include a first rack surface 116 and an opposed second rack surface 118, and the first and second rack surfaces 116, 118 may extend from proximate the first end portion 112 of the elongated body 110 to proximate the second end portion 114. Both the first rack surface 116 and the second rack surface 118 may include a plurality of serrations 120 extending laterally relative to the longitudinal axis A. The serrations 120 of the first rack surface 116 may be oriented for ratcheting engagement with the serrations 78 of the rack surface 76 of the first outer rack member 50, while the serrations 120 of the second rack surface 118 may be oriented for ratcheting engagement with the serrations 98 of the rack surface 96 of the first inner rack member 52.

The body 110 of the first shim 54 may be tapered along the longitudinal axis A. For example, the cross-sectional thickness $C_1$ of the first shim 54 may be thinner proximate the first end portions 112 and thicker proximate the second end portions 114. Therefore, the compression load (arrow L) applied by the first shim 54 may increase as the first shim 54 is inserted in the direction shown by arrow $I_1$. The increasing compression load (arrow L) may further inhibit separation when the second panel 14 is pulled from the first panel 12. Using a first shim 54 having a generally uniform cross-sectional thickness $C_1$ from the first end portions 112 to the second end portions 114 is also contemplated.

The first shim 54 may be positioned between the first outer rack member 50 and the first inner rack member 52, thereby filling the first gap 62 and urging the first outer rack member 50 against the inner surface 35 of the slot 34 of the first panel 12 and the first inner rack member 52 against the first major surface 36 of the second panel 14. With the first shim 54 positioned between the first outer rack member 50 and the first inner rack member 52, the serrations 120 of the first rack surface 116 may be in ratcheting engagement with the serrations 78 of the rack surface 76 of the first outer rack member 50 and the serrations 120 of the second rack surface 118 may be in ratcheting engagement with the serrations 98 of the rack surface 96 of the first inner rack member 52. Therefore, the first outer rack member 50 may be coupled with the first inner rack member 52 by way of the first shim 54 and, thus, the first panel 12 (which may be engaged with the first outer rack member 50) may be coupled with the second panel 14 (which may be engaged with the first inner rack member 52).

Still referring to FIG. 2, the second joining assembly 19 may be positioned in the second gap 64 between the first panel 12 and the second major surface 38 of the second panel 14. Therefore, the second joining assembly 19 may provide a second connection between the first panel 12 and the second panel 14.

The second outer rack member 56 of the second joining assembly 19 may be received in the slot 34 defined by the first panel 12 and may be engaged with the first panel 12. The second outer rack member 56 may include a body 130 elongated along the longitudinal axis A, and including a first end portion 132 and an opposed second end portion 134. The elongated body 130 may include an abutting surface 136 and an opposed rack surface 138, which may extend from proximate the first end portion 132 of the elongated body 130 to proximate the second end portion 134. The rack surface 138 may include a plurality of serrations 140 extending laterally relative to the longitudinal axis A. A first flange 142 may be formed proximate the first end portion 132 of the elongated body 130 and a second flange 144 may be formed proximate the second end portion 134.

The second outer rack member 56 may be engaged with the first panel 12 by positioning the elongated body 130 of the second outer rack member 56 within the slot 34 such that first panel 12 is positioned between the first flange 142 and the second flange 144, and the abutting surface 136 of the elongated body 130 abuts the inner surface 35 of the slot 34. The length of the elongated body 130 of the second outer rack member 56 and, thus, the spacing between the first flange 142 and the second flange 144 may be selected such that first flange 142 abuts the first major surface 30 of the first panel 12 and the second flange 144 abuts the second major surface 32 of the first panel 12, thereby effectively clipping the second outer rack member 56 onto the first panel 12. Therefore, the first flange 142 and the second flange 144 may inhibit movement of the second outer rack member 56 relative to the first panel 12 along the longitudinal axis A.

The second inner rack member 58 of the second joining assembly 19 may be engaged with the second panel 14, such as with the tab 42 of the second panel 14. The second inner rack member 58 may include a body 150 elongated along the longitudinal axis A, and including a first end portion 152 and an opposed second end portion 154. The elongated body 150 may include an abutting surface 156 and an opposed rack surface 158, which may extend from proximate the first end portion 152 of the elongated body 150 to proximate the second end portion 154. The rack surface 158 may include a plurality of serrations 160 extending laterally relative to the longitudinal axis A. One or more bosses 162 may protrude from the abutting surface 156 of the elongated body 150.

The second inner rack member 58 may be engaged with the second panel 14 by positioning the abutting surface 156 of the elongated body 150 of the second inner rack member 58 against the second major surface 38 of the second panel 14 such that the bosses 162 (only one boss 162 is shown in FIG. 2) are received in the corresponding recesses 44 (only one recess 44 is shown in FIG. 2) defined in the tab 42 of the second panel 14. Therefore, the bosses 162 may inhibit movement of the second inner rack member 58 relative to the second panel 14 along the longitudinal axis A.

Like the first inner rack member 52, the second inner rack member 58 may include a fractional round portion 164 connected to the first end portion 152 of the elongated body 150. For example, when the transverse angle θ between the plane $P_{1A}$ (FIG. 2) coincident with the first major surface 30 of the first panel 12 and the plane $P_{2A}$ coincident with the first major surface 36 of the second panel 14 is about 90 degrees, the fractional round portion 164 may be configured as quarter round. The fractional round portion 164 of the second inner rack member 58 may cover the second joining assembly 19, thereby providing an aesthetically pleasing transition between the first panel 12 and the second panel 14, as shown in FIG. 1.

As shown in FIG. 4, the fractional round portion 164 may laterally extend across plural second inner rack members 58, thereby interconnecting the second inner rack members 58. Those skilled in the art will appreciate that a continuous fractional round portion 164 having a length corresponding to the length of the edge 40 of the second panel 14 may provide a continuous and, therefore, more aesthetically pleasing transition between the first panel 12 and the second panel 14 (as compared to multiple adjacently aligned fractional round portions 164).

Referring back to FIG. 2, the second shim 60 of the second joining assembly 19 may include a body 170 elongated along the longitudinal axis A, and including a first end portion 172 and an opposed second end portion 174. The elongated body 170 may include a first rack surface 176 and an opposed second rack surface 178, and the first and second rack surfaces 176, 178 may extend from proximate the first end portion 172 of the elongated body 170 to proximate the second end portion 174. Both the first rack surface 176 and the second rack surface 178 may include a plurality of serrations 180 extending laterally relative to the longitudinal axis A. The serrations 180 of the first rack surface 176 may be oriented for ratcheting engagement with the serrations 160 of the rack surface 158 of the second inner rack member 58, while the serrations 180 of the second rack surface 178 may be oriented for ratcheting engagement with the serrations 140 of the rack surface 138 of the second outer rack member 56.

The body 170 of the second shim 60 may be tapered along the longitudinal axis A. For example, the cross-sectional thickness $C_2$ of the second shim 60 may be thinner proximate the first end portions 172 and thicker proximate the second end portions 174. Therefore, the compression load (arrow L) applied by the second shim 60 may increase as the second shim 60 is inserted in the direction shown by arrow $I_2$. The increasing compression load (arrow L) may further inhibit separation when the second panel 14 is pulled from the first panel 12. Using a second shim 60 having a generally uniform cross-sectional thickness $C_2$ from the first end portions 172 to the second end portions 174 is also contemplated.

The second shim 60 may be positioned between the second outer rack member 56 and the second inner rack member 58, thereby filling the second gap 64 and urging the second outer rack member 56 against the inner surface 35 of the slot 34 of the first panel 12 and the second inner rack member 58 against the second major surface 38 of the second panel 14. With the second shim 60 positioned between the second outer rack member 56 and the second inner rack member 58, the serrations 180 of the first rack surface 176 may be in ratcheting engagement with the serrations 160 of the rack surface 158 of the second inner rack member 58 and the serrations 180 of the second rack surface 178 may be in ratcheting engagement with the serrations 140 of the rack surface 138 of the second outer rack member 56. Therefore, the second inner rack member 58 may be coupled with the second outer rack member 56 by way of the second shim 60 and, thus, the first panel 12 (which may be engaged with the second outer rack member 56) may be coupled with the second panel 14 (which may be engaged with the second inner rack member 58).

Thus, the second panel 14 may be connected to the first panel 12 by inserting a portion (e.g., tab 42) of the second panel 14 into a slot 34 formed in the first panel 12, and then positioning a first joining assembly 17 into the slot 34 between the first panel 12 and the first major surface 36 of the second panel 14 and a second joining assembly 19 into the slot 34 between the first panel 12 and the second major surface 38 of the second panel 14. The first and second outer rack members 50, 56 of the first and second joining assemblies 17, 19 may be engaged with the first panel 12 (e.g., by way of flanges 80, 82, 142, 144), while the first and second inner rack members 52, 58 of the first and second joining assemblies 17, 19 may be engaged with the second panel 14 (e.g., by way of bosses 100, 162). Therefore, when the first and second shims 54, 60 are introduced, the resulting compression of the first and second outer rack members 50, 56 against the first panel 12 and the first and second inner rack members 52, 58 against the second panel 14 may couple the second panel 14 with the first panel 12.

Assembly of the disclosed panel assembly 10 will now be described with reference to FIGS. 4-8. As shown in FIG. 4, the first panel 12 may be provided with slots 34 (four slots 34 are shown) and the second panel 14 may be provided with tabs 42 (four tabs 42 are shown) protruding from the edge 40 of the second panel 14. The joining hardware 16 may be assembled such that the second panel 14 is connected to the first panel 12 along the edge 40 of the second panel 14.

Figure 5:
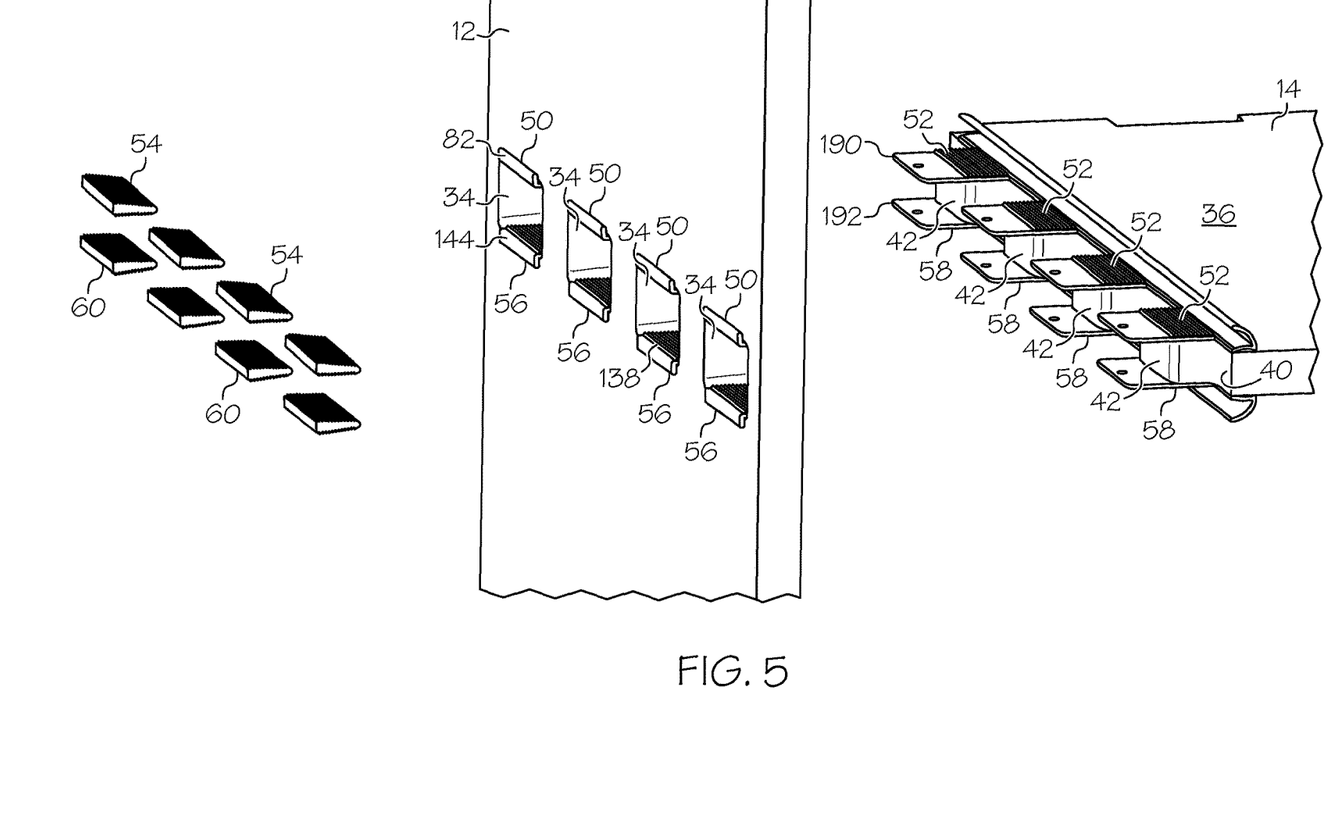
FIG. 5 is a perspective of the panel assembly of FIG. 4, shown at one particular assembly stage.

As shown in FIG. 5, the assembly process may include placing the first and second outer rack members 50, 56 into corresponding slots 34 in the first panel 12. The first and second outer rack members 50, 56 may be placed against the inner surfaces 35 of the slots 34 such the first panel 12 is positioned between the opposed flanges 80, 82, 142, 144 (see FIG. 2) of the first and second outer rack members 50, 56, thereby presenting for engagement the rack surfaces 76, 138 (see FIG. 2) of the first and second outer rack members 50, 56.

The assembly process may further include placing the first and second inner rack members 52, 58 over corresponding tabs 42 of the second panel 14. Specifically, the first inner rack members 52 may be placed over the first major surface 36 of the tabs 42 of the second panel 14, while the second inner rack members 58 may be placed over the second major surface 38 (see FIG. 2) of the tabs 42 of the second panel 14. The first and second inner rack members 52, 58 may be placed such that the bosses 100, 162 (see FIGS. 2 and 4) protruding from the first and second inner rack members 52, 58 are received in corresponding recesses 44 (see FIGS. 2 and 4) in the tabs 42 of the second panel 14, thereby presenting for engagement the rack surfaces 96, 158 (see FIG. 2) of the first and second inner rack members 52, 58.

Thus, the first and second outer rack members 50, 56 may be engaged with the first panel 12, while the first and second inner rack members 52, 58 may be engaged with the second panel 14.

Figure 6:
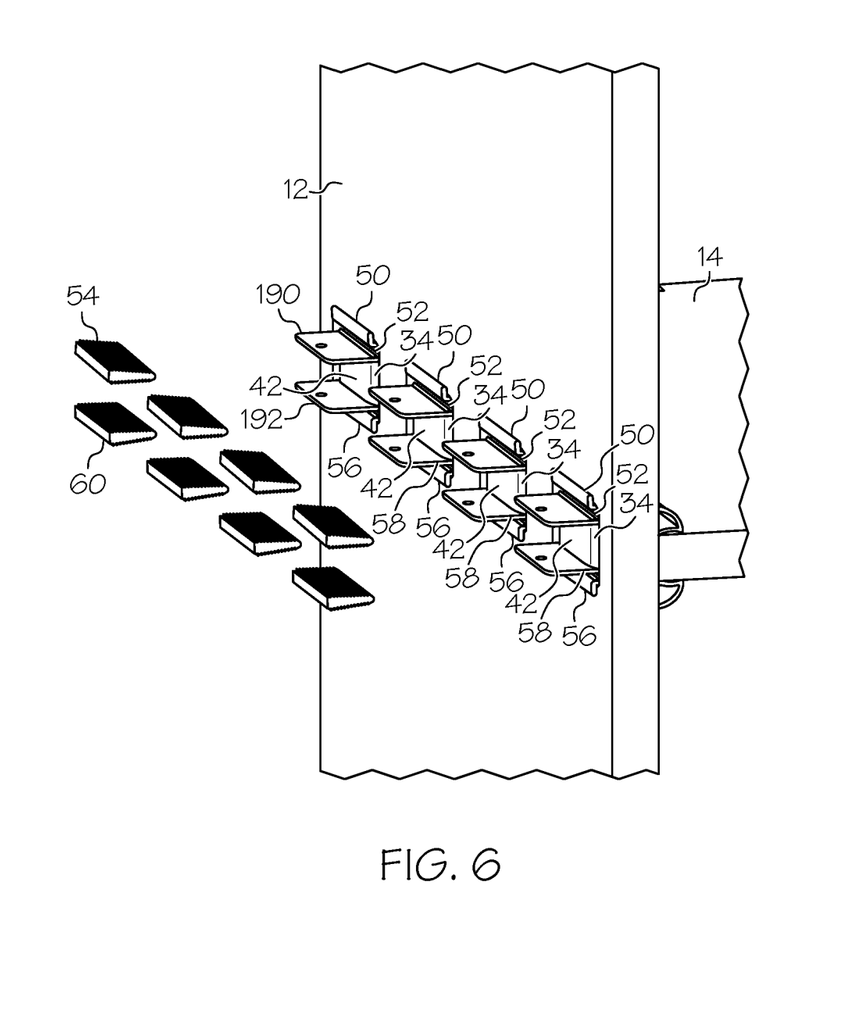
FIG. 6 is a perspective of the panel assembly of FIG. 5, shown at a subsequent assembly stage.

As shown in FIG. 6, the assembly process may further include approximating the second panel 14 with the first panel 12. When fully approximated, the tabs 42 of the second panel 14 (and the engaged first and second inner rack members 52, 58) may be received within corresponding slots 34 in the first panel 12. With the tabs 42 properly received within the slots 34, the rack surfaces 76, 138 (see FIG. 2) of the first and second outer rack members 50, 56 may be opposed from the rack surfaces 96, 158 (see FIG. 2) of the first and second inner rack members 52, 58, as best shown in FIG. 2.

Figure 7:
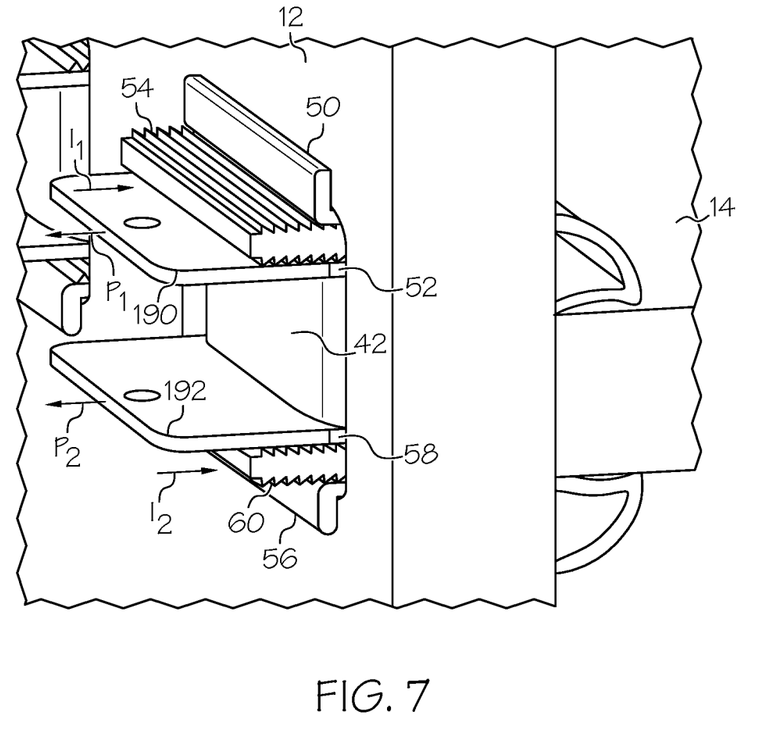
FIG. 7 is a perspective of a portion of the panel assembly of FIG. 6, shown at a subsequent assembly stage.
Figure 8:
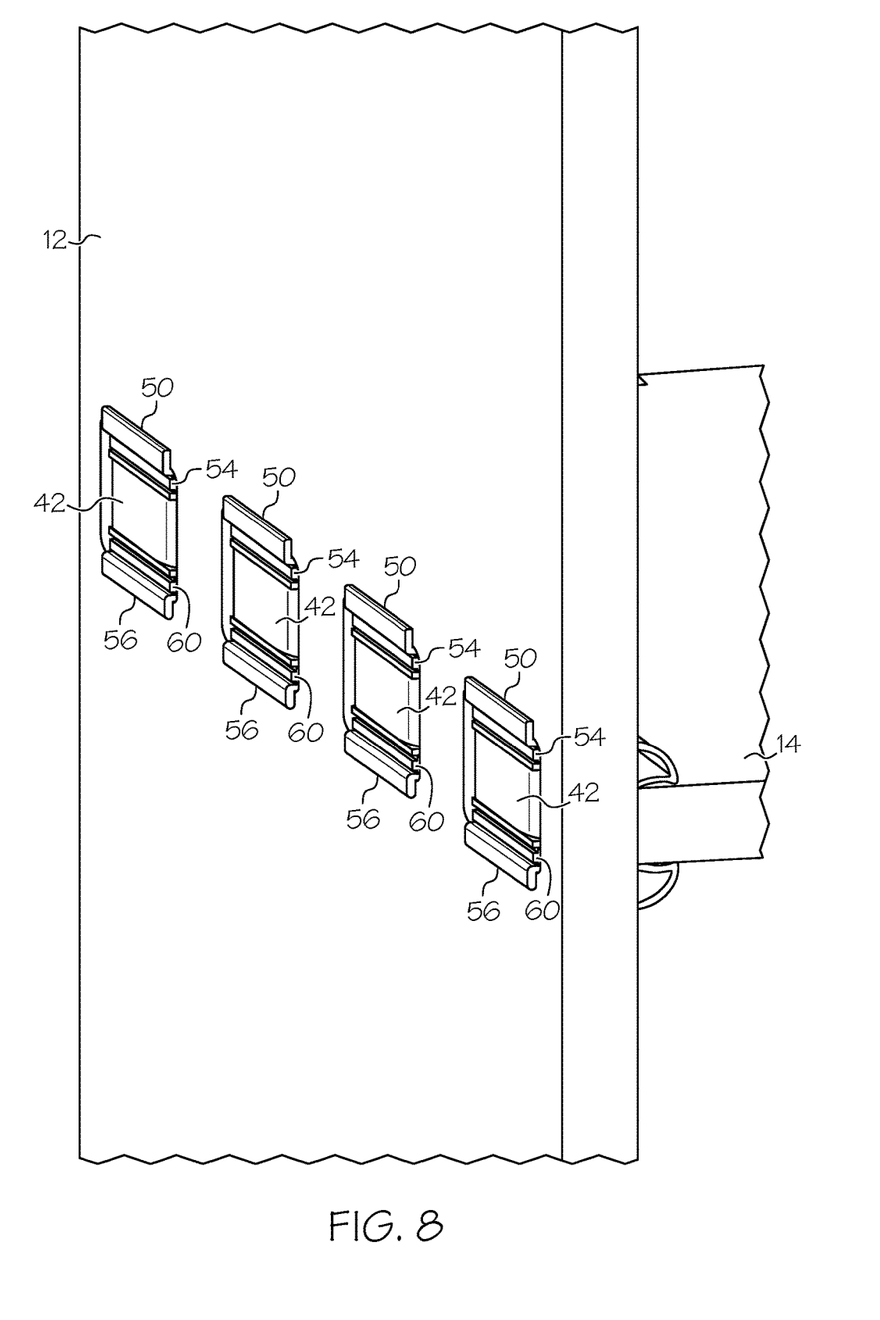
FIG. 8 is a perspective of the panel assembly of FIG. 7, shown at a subsequent assembly stage.

As shown in FIGS. 7 and 8, the assembly process may further include inserting the first and second shims 54, 60. The first shim 54 may be inserted by applying an insertion force (arrow $I_1$ in FIG. 7) to the first shim 54, thereby urging the first shim 54 between the first outer rack member 50 and the first inner rack member 52. The second shim 60 may be inserted by applying an insertion force (arrow $I_2$ in FIG. 7) to the second shim 60, thereby urging the second shim 60 between the second outer rack member 56 and the second inner rack member 58. As the first and second shims 54, 60 are inserted, the first and second rack surfaces 116, 118 of the first shim 54 ratchet along the rack surfaces 76, 96 of the first outer rack member 50 and the first inner rack member 52, while the first and second rack surfaces 176, 178 of the second shim 60 ratchet along the rack surfaces 138, 158 of the second outer rack member 56 and the second inner rack member 58, thereby coupling the first and second outer rack members 50, 56 with the first and second inner rack members 52, 58 while causing separation (compression load (arrows L in FIG. 2)) of the first and second outer rack members 50, 56 from the first and second inner rack members 52, 58.

As shown in FIG. 7, during insertion of the first and second shims 54, 60, it may be necessary to counteract the insertion force (arrows $I_1, I_2$) by applying a pulling force (arrows $P_1, P_2$) to the first and second inner rack members 52, 58. To facilitate application of the pulling force (arrows $P_1, P_2$) to the first and second inner rack members 52, 58, the first and second inner rack members 52, 58 may include gripping tabs 190, 192, which may facilitate grasping and pulling (arrows $P_1$, $P_2$) the first and second inner rack members 52, 58. The first gripping tab 190 may be connected to the second end portion 94 (FIG. 2) of the elongated body 90 (FIG. 2) of the first inner rack member 52. The second gripping tab 192 may be connected to the second end portion 154 (FIG. 2) of the elongated body 150 (FIG. 2) of the second inner rack member 58.

As shown in FIG. 8, after the first and second shims 54, 60 have been fully inserted, the gripping tabs 190, 192 may be removed from the first and second inner rack members 52, 58. Various techniques may be employed for removing the gripping tabs 190, 192 from the first and second inner rack members 52, 58. As one example, the gripping tabs 190, 192 may break away from the first and second inner rack members 52, 58, such as along a pre-formed score line (not shown). As another example, the gripping tabs 190, 192 may be cut from the first and second inner rack members 52, 58.

Because the connection between the second panel 14 and the first panel 12 is effected by a ratcheting engagement between shims 54, 60 and opposed outer rack members 50, 56 and inner rack members 52, 58, the connection may be releasable. Specifically, the connection may be released by applying a force (see arrows $I_1$, $I_2$ in FIG. 2) to the first and second shims 54, 60 until the first and second shims 54, 60 are urged beyond the corresponding inner and outer rack members 50, 52, 56, 58 and exit the slot 34 at the first major surface 30 of the first panel 12. When fractional round 102, 164 is present, the fractional round 102, 164 may first be cut away before urging the first and second shims 54, 60 out of the respective first and second joining assemblies 17, 19 to release the connection between the first and second panels 12, 14.

Figure 9:
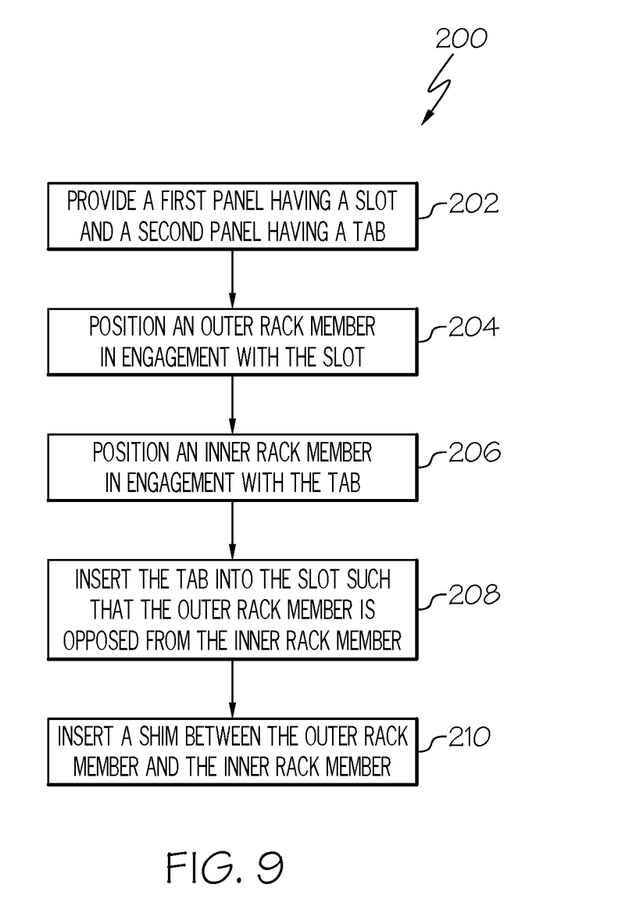
FIG. 9 is a flow diagram depicting one embodiment of the disclosed panel assembling method.

Also disclosed is a panel assembling method. Referring to FIG. 9, one embodiment of the disclosed panel assembling method, generally designated 200, may begin at Block 202 with the step of providing a first panel 12 having a slot 34 formed therein and a second panel 14 including a tab 42.

At Block, 204, an outer rack member 50 may be positioned in the slot 34 in the first panel 12. The outer rack member 50 may be engaged with the first panel 12 such that the outer rack member 50 may not be moveable relative to the first panel 12 along the longitudinal axis A of the slot 34. For example, engagement between the outer rack member 50 and the first panel 12 may be achieved by providing the outer rack member 50 with opposed first and second flanges 80, 82 and positioning a portion of the first panel 12 between the first and second flanges 80, 82.

At Block 206, an inner rack member 52 may be positioned on the tab 42 of the second panel 14. The inner rack member 52 may be engaged with the second panel 14 such that the inner rack member 52 may not be moveable relative to the second panel 14 along the longitudinal axis A. For example, engagement between the inner rack member 52 and the second panel 14 may be achieved by providing the inner rack member 52 with a boss 100 and inserting the boss 100 into a corresponding recess 44 in the tab 42 of the second panel 14.

At Block 208, the tab 42 of the second panel 14 may be inserted into the slot 34 in the first panel 12. Upon proper insertion, the outer rack member 50 (specifically the rack surface 76 of the outer rack member 50) may be opposed from the inner rack member 52 (specifically the rack surface 96 of the inner rack member 52).

At Block 210, a shim 54 may be inserted between the outer rack member 50 and the inner rack member 52. The shim 54 may include first and second rack surfaces 116, 118 which may engage the rack surfaces 76, 96 of the outer rack member 50 and the inner rack member 52, respectively. Therefore, the shim 54 may be in ratcheting engagement with the outer rack member 50 and the inner rack member 52.

Figure 10:
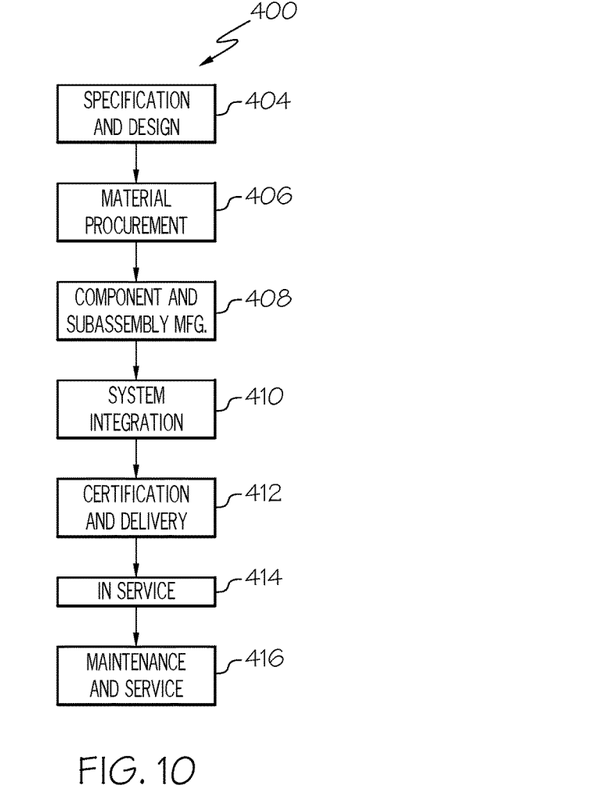
FIG. 10 is a flow diagram of an aircraft manufacturing and service methodology.
Figure 11:
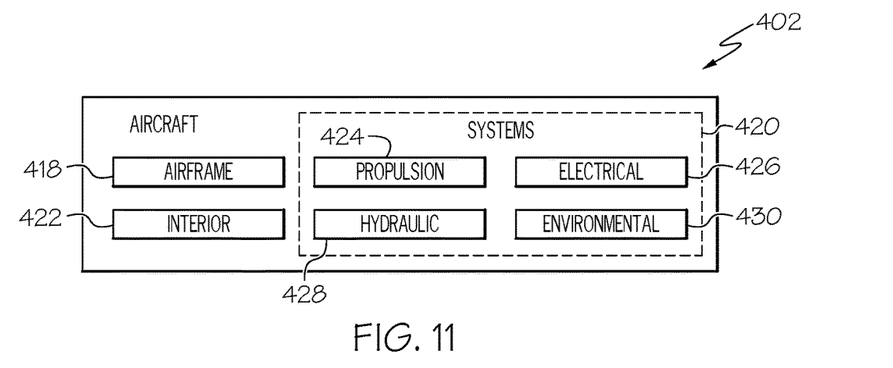
FIG. 11 is a block diagram of an aircraft.

Examples of the disclosure may be described in the context of an aircraft manufacturing and service method 400, as shown in FIG. 10, and an aircraft 402, as shown in FIG. 11. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed sandwich panel assembly and method may be employed during any one or more of the stages of the aircraft manufacturing and service method 400. As one example, the disclosed sandwich panel assembly and method may be employed during material procurement 406. As another example, components or subassemblies corresponding to component/subassembly manufacturing 408, system integration 410, and or maintenance and service 416 may be fabricated or manufactured using the disclosed sandwich panel assembly and method. As another example, the airframe 418 and the interior 422 may be constructed using the disclosed sandwich panel assembly and method. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed sandwich panel assembly and method are described in the context of an aircraft; however, one of ordinary skill in the art will readily recognize that the disclosed sandwich panel assembly and method may be utilized for a variety of applications. For example, the disclosed sandwich panel assembly and method may be implemented in various types of vehicle including, e.g., helicopters, passenger ships, automobiles and the like.

Although various embodiments of the disclosed sandwich panel assembly and method have been shown and described, modifications may occur to those skilled in the art upon reading the specification. The present application includes such modifications and is limited only by the scope of the claims.

What is claimed is:

1. A panel assembly comprising:
   a first panel defining a slot;
   a second panel comprising a tab, wherein said tab is received in said slot and defines a gap in said slot between said tab and said first panel; and
   a joining assembly positioned in said gap, said joining assembly comprising:
      an outer rack member engaged with said first panel;
      an inner rack member engaged with said second panel; and
      a shim in ratcheting engagement with said outer rack member and said inner rack member.

2. The panel assembly of claim 1 wherein at least one of said first panel and said second panel comprises a core sandwiched between a first face sheet and a second face sheet.

3. The panel assembly of claim 1 wherein said second panel is disposed at a transverse angle relative to said first panel.

4. The panel assembly of claim 3 wherein said transverse angle is about 90 degrees.

5. The panel assembly of claim 1 wherein said outer rack member comprises an elongated body having a first end portion and an opposed second end portion, said elongated body comprising a rack surface extending from proximate said first end portion to proximate said second end portion, said rack surface comprising a plurality of serrations.

6. The panel assembly of claim 5 wherein said shim is in ratcheting engagement with said plurality of serrations of said rack surface of said outer rack member.

7. The panel assembly of claim 5 wherein said shim comprises a rack surface comprising a plurality of serrations, and wherein said plurality of serrations of said rack surface of said shim are engaged with said plurality of serrations of said rack surface of said outer rack member.

8. The panel assembly of claim 5 wherein said outer rack member further comprises a first flange connected proximate said first end portion and a second flange connected proximate said second end portion, and wherein said first panel is positioned between said first flange and said second flange.

9. The panel assembly of claim 1 wherein said inner rack member comprises an elongated body having a first end portion and an opposed second end portion, said elongated body comprising a rack surface extending from proximate said first end portion to proximate said second end portion, said rack surface comprising a plurality of serrations.

10. The panel assembly of claim 9 wherein said shim is in ratcheting engagement with said plurality of serrations of said rack surface of said inner rack member.

11. The panel assembly of claim 9 wherein said shim comprises a rack surface comprising a plurality of serrations, and wherein said plurality of serrations of said rack surface of said shim are engaged with said plurality of serrations of said rack surface of said inner rack member.

12. The panel assembly of claim 9 wherein said elongated body further comprises an abutting surface opposed from said rack surface, and wherein a boss protrudes from said abutting surface.

13. The panel assembly of claim 12 wherein said tab defines a recess, and wherein said boss is received in said recess.

14. The panel assembly of claim 9 wherein said inner rack member further comprises a fractional round portion connected to said first end portion of said elongated body.

15. The panel assembly of claim 1 wherein said shim has a substantially uniform cross-sectional thickness.

16. A panel assembly comprising:
    a first panel comprising a first major surface and a second major surface, said first panel defining a slot extending from said first major surface to said second major surface along a longitudinal axis;
    a second panel comprising a first major surface and a second major surface, said second panel defining an edge and comprising a tab extending from said edge, wherein said tab is received in said slot and defines a first gap between said first panel and said first major surface of said second panel, and a second gap between said first panel and said second major surface of said second panel;
    a first joining assembly positioned in said first gap, said first joining assembly comprising:
       a first outer rack member engaged with said first panel;
       a first inner rack member engaged with said second panel; and
       a first shim in ratcheting engagement with said first outer rack member and said first inner rack member; and
    a second joining assembly positioned in said second gap, said second joining assembly comprising:
       a second outer rack member engaged with said first panel;
       a second inner rack member engaged with said second panel; and
       a second shim in ratcheting engagement with said second outer rack member and said second inner rack member.

17. The panel assembly of claim 16 wherein said first outer rack member comprises a first flange engaged with said first panel and said second outer rack member comprises a second flange engaged with said first panel.

18. The panel assembly of claim 17 wherein said first inner rack member comprises a first boss engaged with said second panel and said second inner rack member comprises a second boss engaged with said second panel.

19. The panel assembly of claim 16 wherein said first shim is positioned between said first outer rack member and said first inner rack member, and wherein said first shim comprises a first rack surface and an opposed second rack surface, said first rack surface being in ratcheting engagement with corresponding serrations on said first outer rack member and said second rack surface being in ratcheting engagement with corresponding serrations on said first inner rack member.

20. A method for assembling a first panel and a second panel, said first panel defining a slot and said second panel comprising a tab, said method comprising:
    positioning an outer rack member in said slot such that said outer rack member is engaged with said first panel;
    positioning an inner rack member on said tab such that said inner rack member is engaged with said second panel;
    inserting said tab into said slot such that said outer rack member is opposed from said inner rack member; and
    inserting a shim between said outer rack member and said inner rack member, said shim being in ratcheting engagement with said outer rack member and said inner rack member.

* * * * *